(12) United States Patent
Huang

(10) Patent No.: US 9,431,747 B1
(45) Date of Patent: Aug. 30, 2016

(54) FLASH DRIVE AND PROTECTIVE COVER MOUNTING STRUCTURE

(71) Applicant: HOEY CO., LTD., Taoyuan (TW)

(72) Inventor: Joseph Huang, Taoyuan (TW)

(73) Assignee: HOEY CO., LTD., Taoyuan (TW)

( * ) Notice: Subject to any disclaimer, the term of this patent is extended or adjusted under 35 U.S.C. 154(b) by 0 days.

(21) Appl. No.: 14/858,123

(22) Filed: Sep. 18, 2015

(30) Foreign Application Priority Data

Jul. 28, 2015 (TW) .................................. 104212083

(51) Int. Cl.
*H01R 13/447* (2006.01)
*H01R 13/66* (2006.01)
*H01R 13/44* (2006.01)

(52) U.S. Cl.
CPC ............ *H01R 13/447* (2013.01); *H01R 13/44* (2013.01); *H01R 13/665* (2013.01)

(58) Field of Classification Search
CPC H01R 13/44; H01R 13/447; H01R 13/4532; H01R 13/4536
USPC .................................. 439/142, 135, 136, 147
See application file for complete search history.

(56) References Cited

U.S. PATENT DOCUMENTS

| 6,926,544 | B2* | 8/2005 | Lee ...................... H01R 13/447 439/147 |
| 6,932,629 | B2* | 8/2005 | Ikenoue ............... H05K 5/0278 439/136 |
| 7,473,112 | B2* | 1/2009 | Zhu ...................... H05K 5/0278 439/142 |
| 7,500,858 | B2* | 3/2009 | Emerson ............. H01R 13/447 439/131 |
| 7,699,630 | B2* | 4/2010 | Kim ..................... H05K 5/0278 439/136 |
| 7,740,495 | B1* | 6/2010 | Lo .......................... G06K 19/07 439/142 |
| 7,744,387 | B2* | 6/2010 | Yu .................... G06K 19/07732 439/136 |
| 7,794,246 | B2* | 9/2010 | Cheng .................... H01R 13/44 439/138 |
| 7,883,353 | B2* | 2/2011 | Hao ..................... G06K 19/041 439/358 |
| 8,179,670 | B2* | 5/2012 | Huang .................. B21D 31/02 361/679.02 |
| 8,241,047 | B2* | 8/2012 | Ni .................... G06K 19/07732 439/131 |
| 8,246,362 | B2* | 8/2012 | Ma ...................... H01R 13/447 361/752 |
| 8,500,467 | B2* | 8/2013 | Ni .................... G06K 19/07732 439/136 |

(Continued)

FOREIGN PATENT DOCUMENTS

TW M497329 10/2014

*Primary Examiner* — Neil Abrams
*Assistant Examiner* — Travis Chambers
(74) *Attorney, Agent, or Firm* — Guice Patents PLLC

(57) ABSTRACT

A flash drive and protective cover mounting structure includes a flash drive consisting of a casing, a memory module, a electrical connector and a positioning member, and a protective cover including a substantially U-shaped and relatively larger outer cover component having a smooth outer surface and a substantially U-shaped and relatively smaller inner cover component mounted in the outer cover component pivotally connected to the casing and biasable relative to the casing between an open position to expose the electrical connector and a closed position to shield the electrical connector.

7 Claims, 11 Drawing Sheets

(56) References Cited

U.S. PATENT DOCUMENTS

| | | | | |
|---|---|---|---|---|
| 2007/0063249 A1* | 3/2007 | Rambosek | ............ | H05K 5/0278 257/315 |
| 2008/0094807 A1* | 4/2008 | Hiew | .................. | G06F 12/1416 361/737 |
| 2010/0248512 A1* | 9/2010 | Hiew | .................. | H01R 13/6395 439/142 |
| 2011/0013354 A1* | 1/2011 | Huang | .................. | B21D 31/02 361/679.31 |
| 2011/0237099 A1* | 9/2011 | Ni | .................... | G06K 19/07732 439/142 |
| 2013/0107442 A1* | 5/2013 | Zhou | .................... | H01R 13/447 361/679.32 |
| 2015/0031223 A1* | 1/2015 | Liao | ........................ | H01R 13/44 439/136 |
| 2016/0098066 A1* | 4/2016 | Huang | .................... | G06F 1/181 361/679.32 |
| 2016/0099515 A1* | 4/2016 | Huang | .................... | G06F 1/182 361/679.32 |

\* cited by examiner

FLASH DRIVE AND PROTECTIVE COVER MOUNTING STRUCTURE

BACKGROUND OF THE INVENTION

1. Field of the Invention

The present invention relates to flash drive technology and more particularly, to a flash drive and protective cover mounting structure, which uses a double layer design of protective cover for protecting the electrical connector, eliminating any further surface treatment and facilitating quick production.

2. Description of the Related Art

A flash drive is a data storage device using flash memory for storing and transmitting data. Regular flash drives commonly use a Universal Serial Bus (USB) as a standard transmitting interface. Nowadays, flash drives have been widely used in smart phones, cameras, tablet computers, and many other mobile electronic products. With fast development of data storage technology, small-sized high-capacity flash drives (flash drives) have been continuously created and have appeared on the market.

A conventional flash drive generally comprises a casing, a printed circuit board mounted in the casing, a flash memory installed in the printed circuit board, an Universal Serial Bus (USB) interface integrated with the printed circuit board and extended out of the casing, and a protective cover detachably capped on the casing to shield the Universal Serial Bus (USB) interface. Before each use, the user needs to open the protective cover from the casing so that the Universal Serial Bus (USB) interface can be inserted into a mating Universal Serial Bus (USB) interface of an external electronic apparatus. After the use and removal of the flash drive from the external electronic apparatus, the user may forget to take back the protective cover.

Taiwan Utility Model Patent M497329 disclosed a flash drive, entitled "Flash drive with pivoted protective cover" that allows the protective cover to be biased between an open position to expose the USB connector and a closed position to shield the USB connector. According to this design, the flash drive comprises a casing 10 having a standard USB connector 11 extended out of one end thereof, and a substantially U-shaped protective cover 12 having a pivot connection portion 13 located at an eccentric location and pivotally coupled to a mating pivot connection portion (not shown) at the casing 10. For the sake of beauty, an ornament is provided to the pivot connection portion 13 from sight. Thus, the protective cover 12 can be biased relative to the casing 10 between an open position to expose the USB connector 11 and a closed position to shield the USB connector 11. Because the protective cover 12 is pivotally connected to the casing 10, it can shield the electrical connector 11 and will not be lost. According to this design, it is necessary to make a pivot connection portion 13 at the protective cover 12 and a mating pivot connection portion at the casing 10 for the connection of the pivot connection portion 13 of the protective cover 12. After formation of the pivot connection portion 13 at the protective cover 12 and the mating pivot connection portion at the casing 10, a further surface treatment such as polishing must be employed to smoothen the surface of the protective cover 12 and the surface of the casing 10, consuming much time and labor and relatively increasing the product cost. Further, even an ornament is installed to keep the pivot connection portion 13 from sight, the outer appearance of the protective cover 12 cannot be maintained planar, affecting the overall sense of beauty of the product.

SUMMARY OF THE INVENTION

The present invention has been accomplished under the circumstances in view. It is the main object of the present invention to provide a flash drive and protective cover mounting structure, which does not require a further surface treatment after coupling between the protective cover and the casing, saving much time and cost and facilitating quick production.

It is the main object of the present invention to provide a flash drive and protective cover mounting structure, which exhibits a smooth product outer appearance without any machining traces after coupling between the protective cover and the casing.

To achieve this and other objects of the present invention, a flash drive and protective cover mounting structure comprises a flash drive consisting of a casing, a memory module, a electrical connector and a positioning member, and a protective cover pivotally connected to the casing and biasable relative to the casing between an open position to expose the electrical connector and a closed position to shield the electrical connector. The casing comprises an eccentric pivot positioning structure located at opposing top and bottom sides thereof. The protective cover comprises a substantially U-shaped and relatively larger outer cover component and a substantially U-shaped and relatively smaller inner cover component mounted in the outer cover component. The outer cover component comprises a recessed inner surface area located at an inner side thereof. The inner cover component is positioned in the recessed inner surface area of the outer cover component, comprising a pivot connection structure pivotally coupled to the eccentric pivot positioning structure of the casing. Thus, the protective cover has a smooth outer surface without further surface treatment and is pivotally coupled to the casing.

Preferably, the eccentric pivot positioning structure comprises an upper pivot-connection portion downwardly protruded from a bottom surface of a top wall of the inner cover component, a guide plate downwardly protruded from the bottom surface of the top wall of the inner cover component adjacent to the upper pivot-connection portion, a lower pivot-connection portion upwardly protruded from a top surface of an opposing bottom wall of the inner cover component and facing toward the upper pivot-connection portion, and a position-limit protrusion upwardly protruded from the top surface of the opposing bottom wall of the inner cover component adjacent to the lower pivot-connection portion.

Preferably, the eccentric pivot positioning structure of the casing comprises an circular upper raised portion located in one corner of a top wall of the casing, an upper pivot hole cut through the center of the circular upper raised portion and pivotally coupled to the upper pivot-connection portion of the eccentric pivot positioning structure, a circular arched groove located in the circular upper raised portion around the upper pivot hole and movably coupled with the guide plate of the eccentric pivot positioning structure, a circular lower raised portion located in one corner of an opposing bottom wall of the casing corresponding to the circular upper raised portion, a lower pivot hole cut through the center of the circular lower raised portion and pivotally coupled to the lower pivot-connection portion of the eccentric pivot positioning structure, and a first recess and a second recess located in the circular lower raised portion around the lower pivot hole and spaced from each other at a predetermined angle and adapted for receiving the position-limit protrusion selectively.

Preferably, the position-limit protrusion is double-beveled.

Preferably, the outer cover component further comprises a retaining border edge smoothly curved and extending around the recessed inner surface area to secure the inner cover component firmly in the recessed inner surface area.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
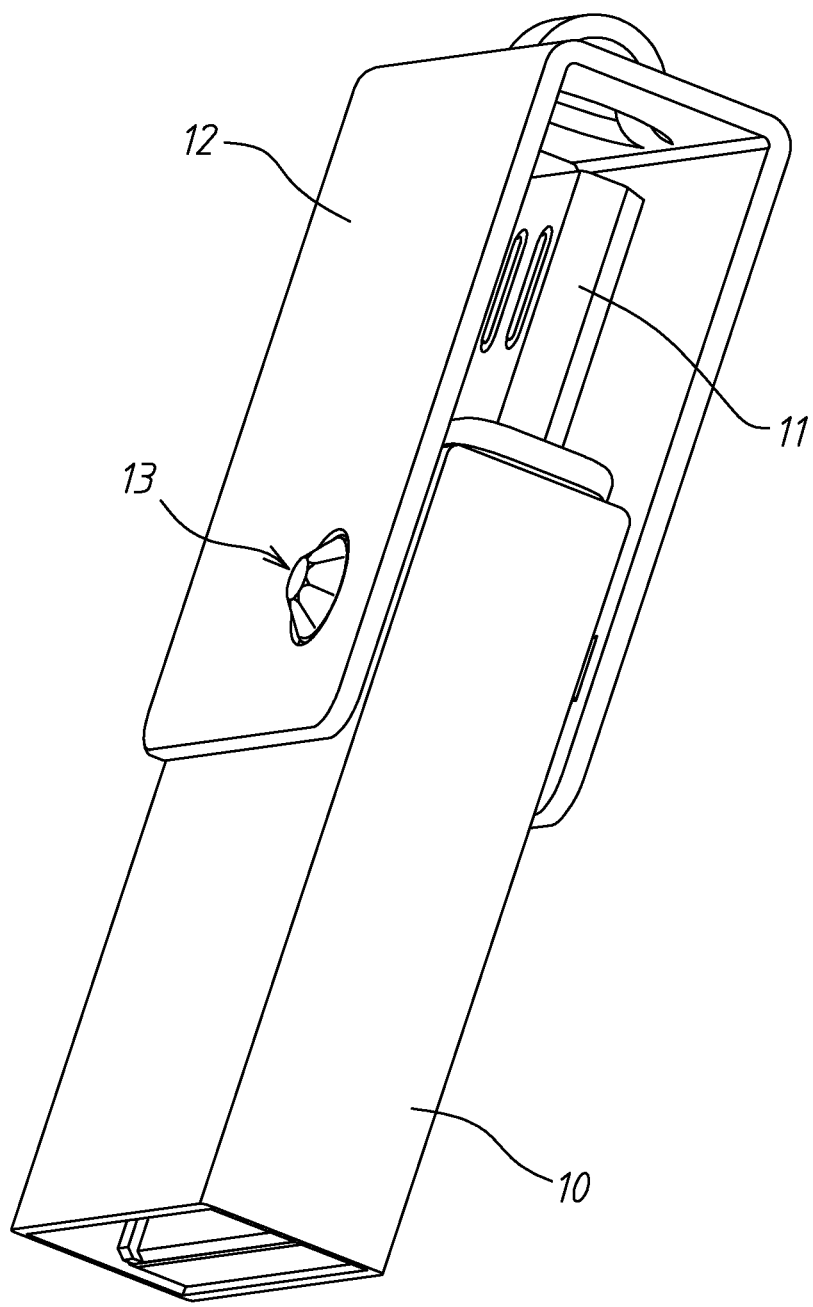
FIG. 1 is an oblique top elevational view of a flash drive according to the prior art.
Figure 2:
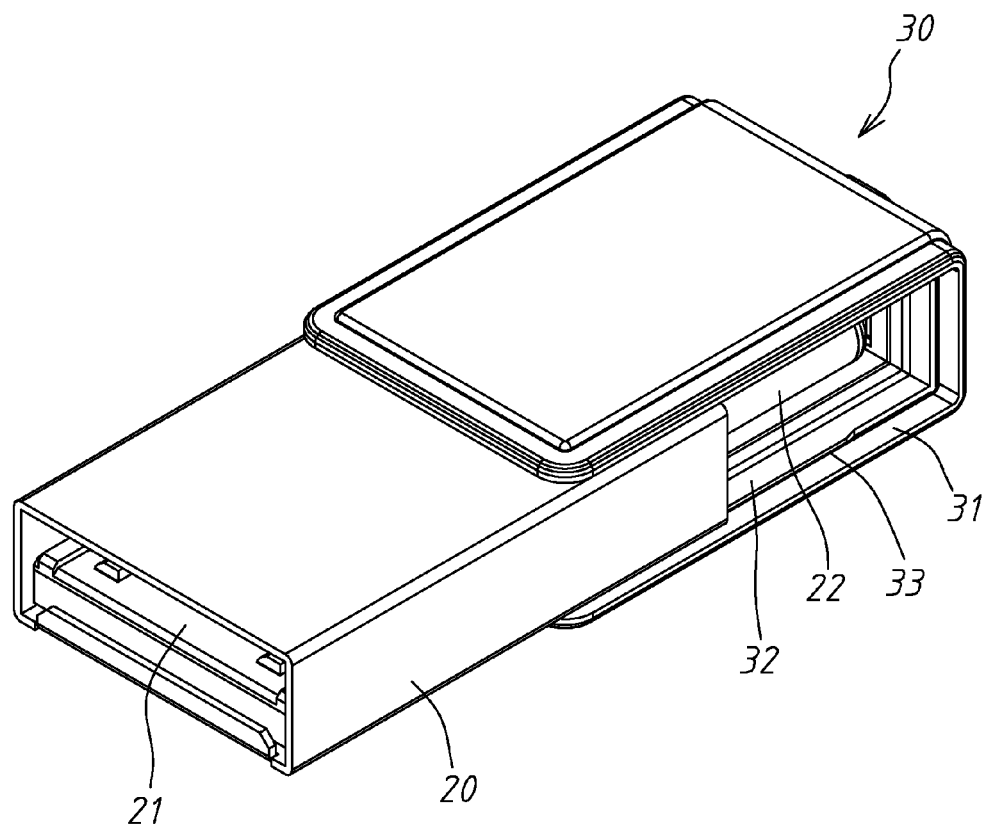
FIG. 2 is an oblique top elevational view of a flash drive and protective cover mounting structure in accordance with the present invention.
Figure 3:
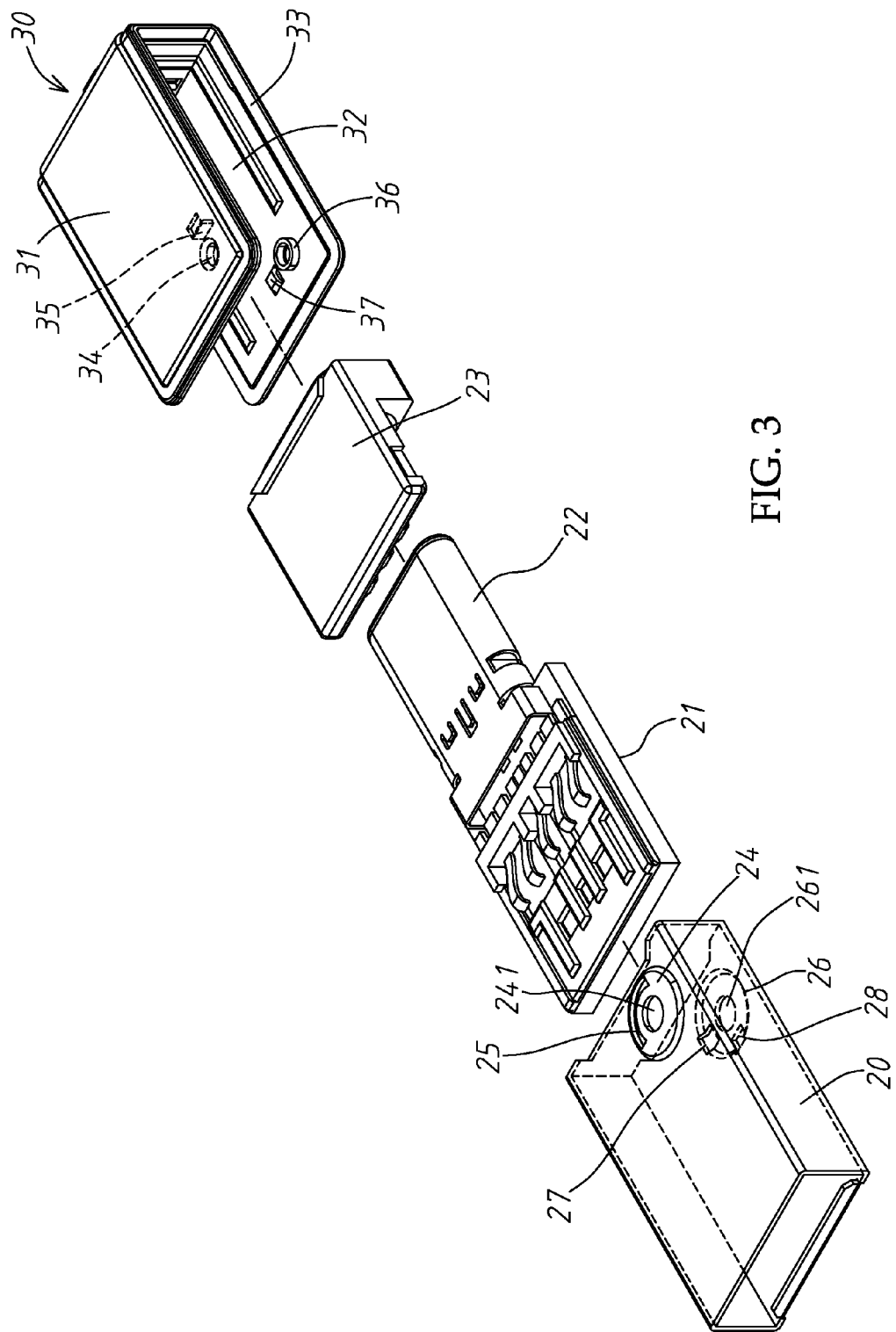
FIG. 3 is an exploded view of the flash drive and protective cover mounting structure shown in FIG. 2.

Referring to FIGS. 2 and 3, a flash drive and protective cover mounting structure in accordance with the present invention is shown. The flash drive and protective cover mounting structure comprises a flash memory comprising a casing 20, a memory module 21, an electrical connector 22 and a positioning member 23, and a protective cover 30.

The memory module 21 is mounted in the casing 20. The electrical connector 22 is connected to a front side of the memory module 21 and extended out of the casing 20. The positioning member 23 is mounted around the electrical connector 22. The protective cover 30 is coupled to the casing 20 and adapted for protecting the electrical connector 22. Further, the casing 20 comprises an eccentric pivot positioning structure located at opposing top and bottom sides thereof. This eccentric pivot positioning structure comprises an circular upper raised portion 24 located in one corner of a top wall of the casing 20, an upper pivot hole 241 cut through the center of the circular upper raised portion 24, a circular arched groove 25 (in this embodiment, the circular arched groove 25 extends at an angle of 90°) located in the circular upper raised portion 24 around the upper pivot hole 241, a circular lower raised portion 26 located in one corner of an opposing bottom wall of the casing 20 corresponding to the circular upper raised portion 24, a lower pivot hole 261 cut through the center of the circular lower raised portion 26, and a first recess 27 and a second recess 28 located in the circular lower raised portion 26 around the lower pivot hole 261 and spaced from each other at a predetermined angle (in this embodiment, this predetermined angle is 90°).

Figure 4:
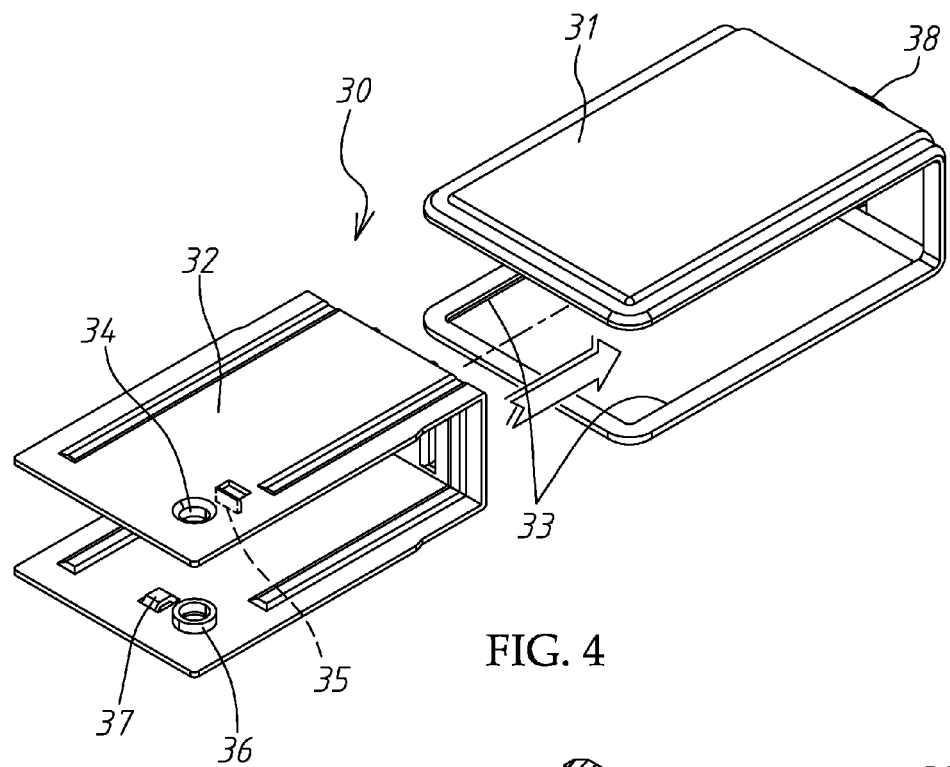
FIG. 4 is an exploded view of the protective cover shown in FIG. 3.
Figure 5:
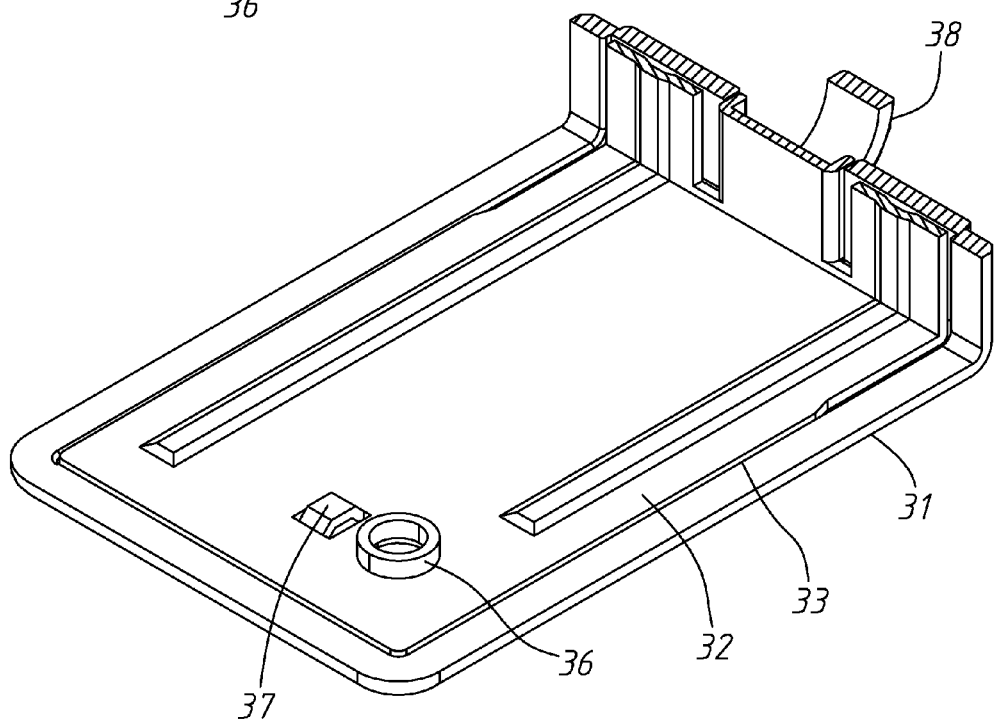
FIG. 5 is a transverse sectional elevational view of the protective cover shown in FIG. 3.
Figure 6:
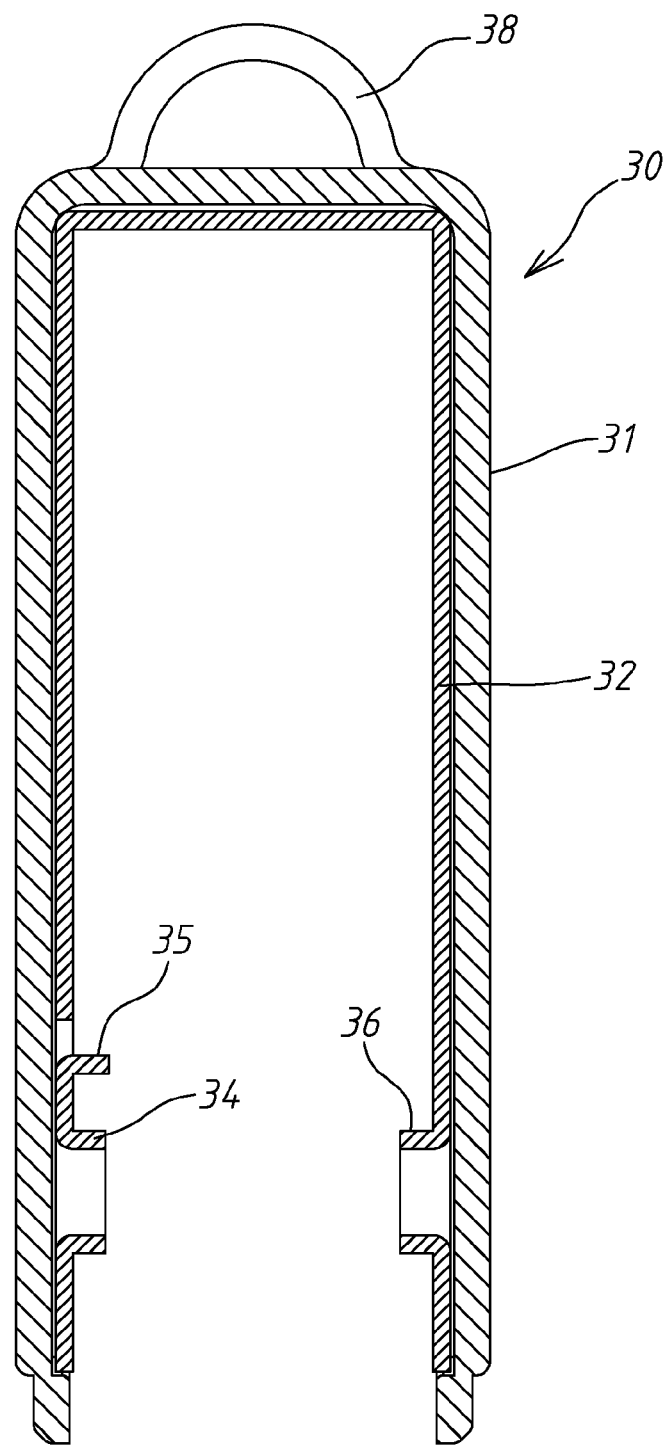
FIG. 6 is a longitudinal sectional view of the protective cover shown in FIG. 3.
Figures 7, 8:
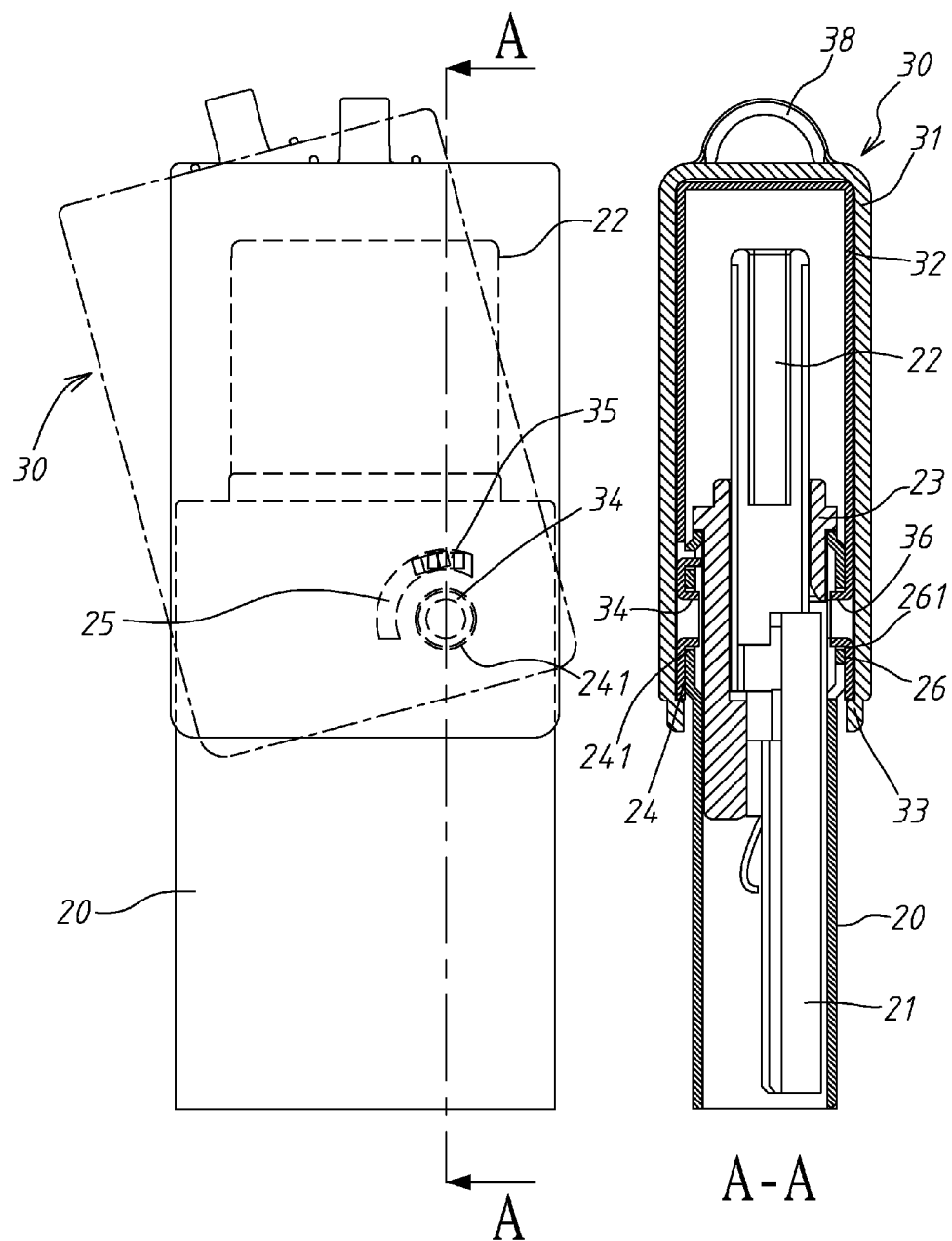
FIG. 7 is a schematic front view illustrating the protective cover biased relative to the casing.
FIG. 8 is a sectional view taken along line A-A of FIG. 7.
Figure 9:
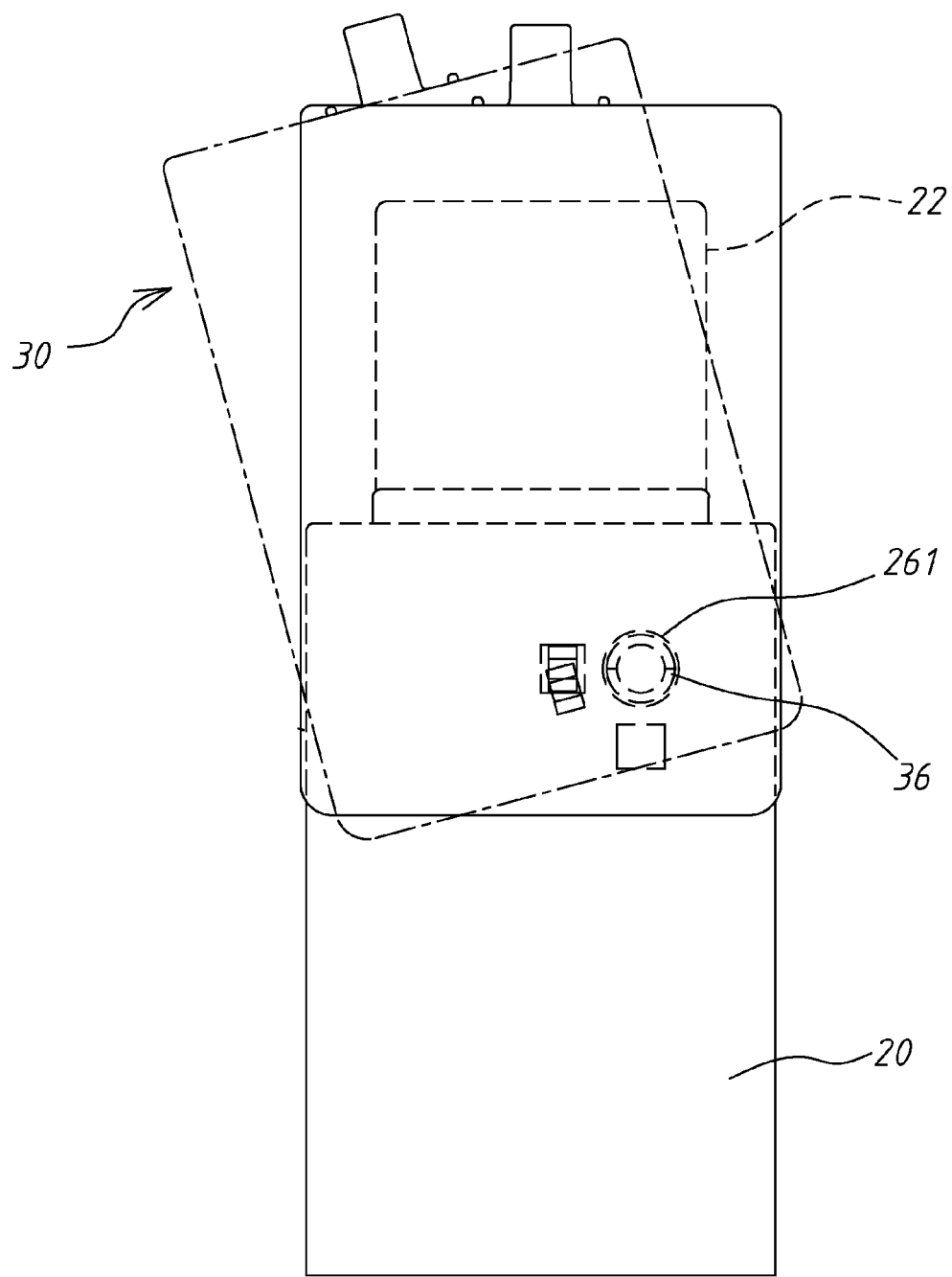
FIG. 9 is a schematic rear side view illustrating the protective cover biased relative to the casing.

Referring to FIGS. 4-6, the protective cover 30 is a substantially U-shaped plate member comprising a substantially U-shaped and relatively larger outer cover component 31 and a substantially U-shaped and relatively smaller inner cover component 32 mounted in the outer cover component 31. In this embodiment, the outer cover component 31 and inner cover component 32 are substantially similar in shape, however, the outer cover component 31 is larger than the inner cover component 32. The outer cover component 31 comprises a recessed inner surface area 33 located at an inner side thereof and configured according to the size of the inner cover component 32 so that the inner cover component 32 can be positioned in the recessed inner surface area 33. Further, the inner cover component 32 comprises a pivot connection structure pivotally coupled to the eccentric pivot positioning structure of the casing 20. In this embodiment, the pivot connection structure comprises an upper pivot-connection portion 34 downwardly protruded from a bottom surface of a top wall of the inner cover component 32 and pivotally coupled to the upper pivot hole 241 at the circular upper raised portion 24 of the casing 20, a guide plate 35 downwardly protruded from the bottom surface of the top wall of the inner cover component 32 and slidably coupled to the circular arched groove 25 of the eccentric pivot positioning structure of the casing 20, a lower pivot-connection portion 36 upwardly protruded from a top surface of an opposing bottom wall of the inner cover component 32 and pivotally coupled to the lower pivot hole 261 at the circular lower raised portion 26 of the casing 20, and a double-beveled position-limit protrusion 37 upwardly protruded from the top surface of the bottom wall of the inner cover component 32 and selectively positioned in one of the first recess 27 and the second recess 28. Further, a hanging hook 38 is provided at one end of the outer cover component 31 for hanging.

Referring to FIG. 5 and FIGS. 7-9, after pivotally coupled the upper pivot-connection portion 34 and lower pivot-connection portion 36 of the protective cover 30 to the respective upper pivot hole 241 and lower pivot hole 261 of the casing 20, the guide plate 35 is positioned in one end of the circular arched groove 25, and the double-beveled position-limit protrusion 37 is normally positioned in the first recess 27.

Referring to FIGS. 7-9 again, when using the flash drive, bias the protective cover 30 to rotate the upper pivot-connection portion 34 and lower pivot-connection portion 36 of the protective cover 30 relative to the upper pivot hole 241 and lower pivot hole 261 of the casing 20. At this time, the guide plate 35 is moved along the circular arched groove 25 from its one end to the other end, and the double-beveled position-limit protrusion 37 is moved out of the first recess 27 and then positioned in the second recess 28. When the double-beveled position-limit protrusion 37 is positioned in the second recess 28, the protective cover 30 is disposed substantially perpendicular to the casing 20, and thus, the electrical connector 22 is exposed outside the protective cover 30 for connection to a mating electrical connector of an external electronic apparatus.

Figure 10:
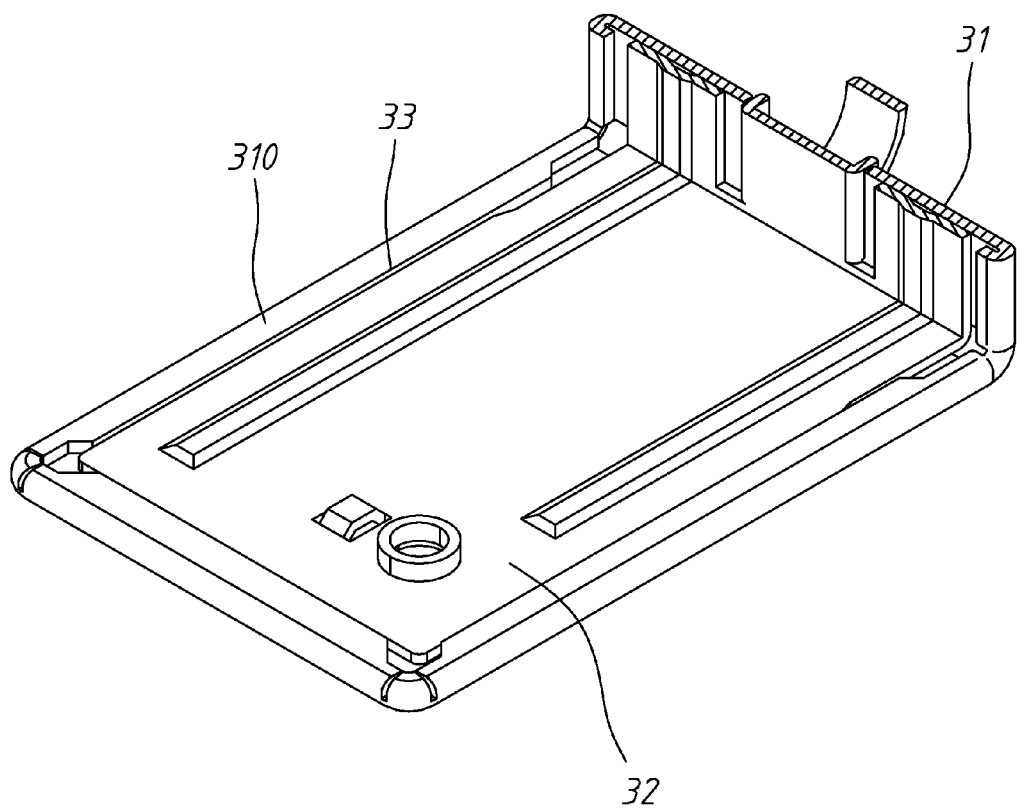
FIG. 10 is a sectional elevational view of an alternate form of the protective cover.
Figure 11:
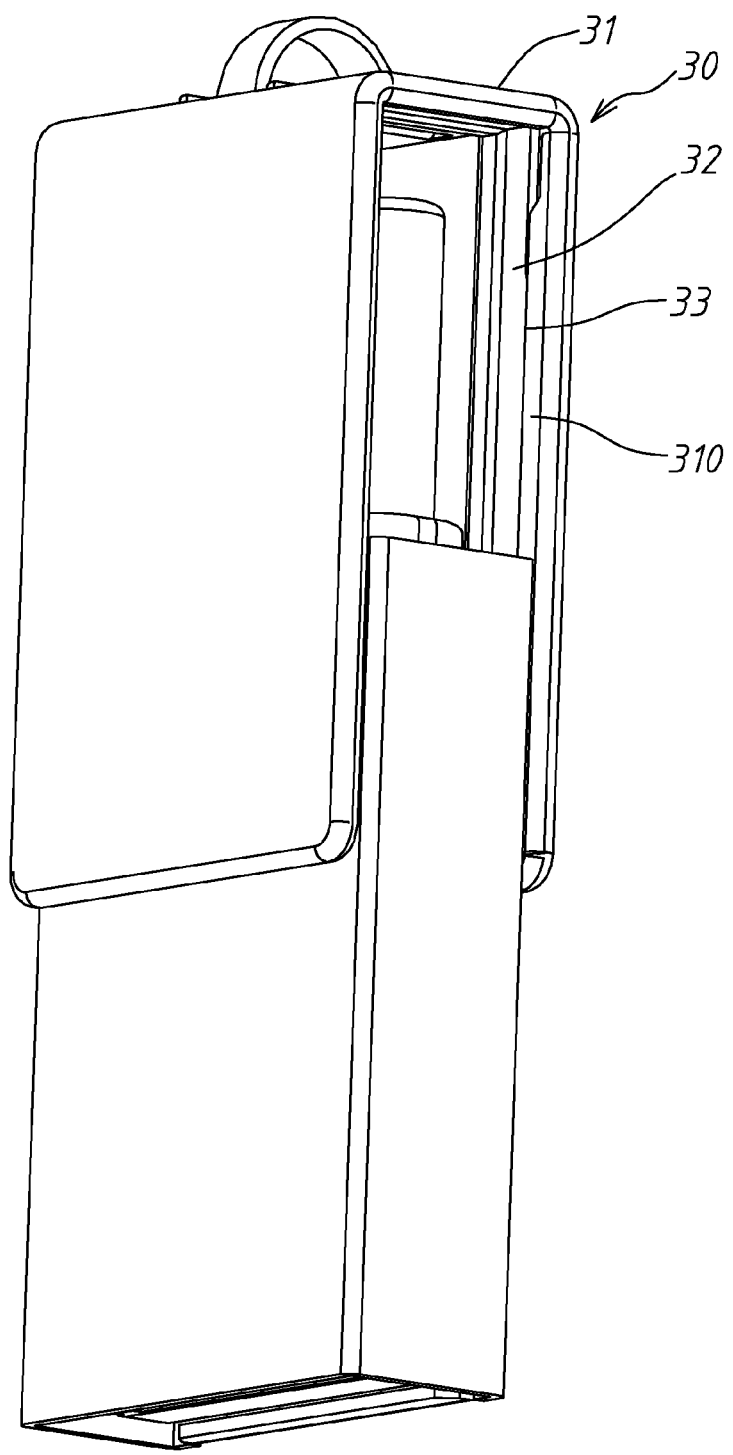
FIG. 11 is an oblique elevational view of the present invention, illustrating the protective cover of FIG. 10 used in the flash drive and protective cover mounting structure.

Referring to FIGS. 10 and 11, in an alternate form of the present invention, the outer cover component 31 comprises a recessed inner surface area 33 located at an inner side thereof and adapted for accommodating the inner cover component 32, and a retaining border edge 310 smoothly curved and extending around the recessed inner surface area 33 for securing the inner cover component 32 firmly in the recessed inner surface area 33 to enhance structural stability of the protective cover 30. The smoothly curved retaining border edge 310 enables the protective cover 30 to exhibit a sleek outer appearance.

Figure 12:
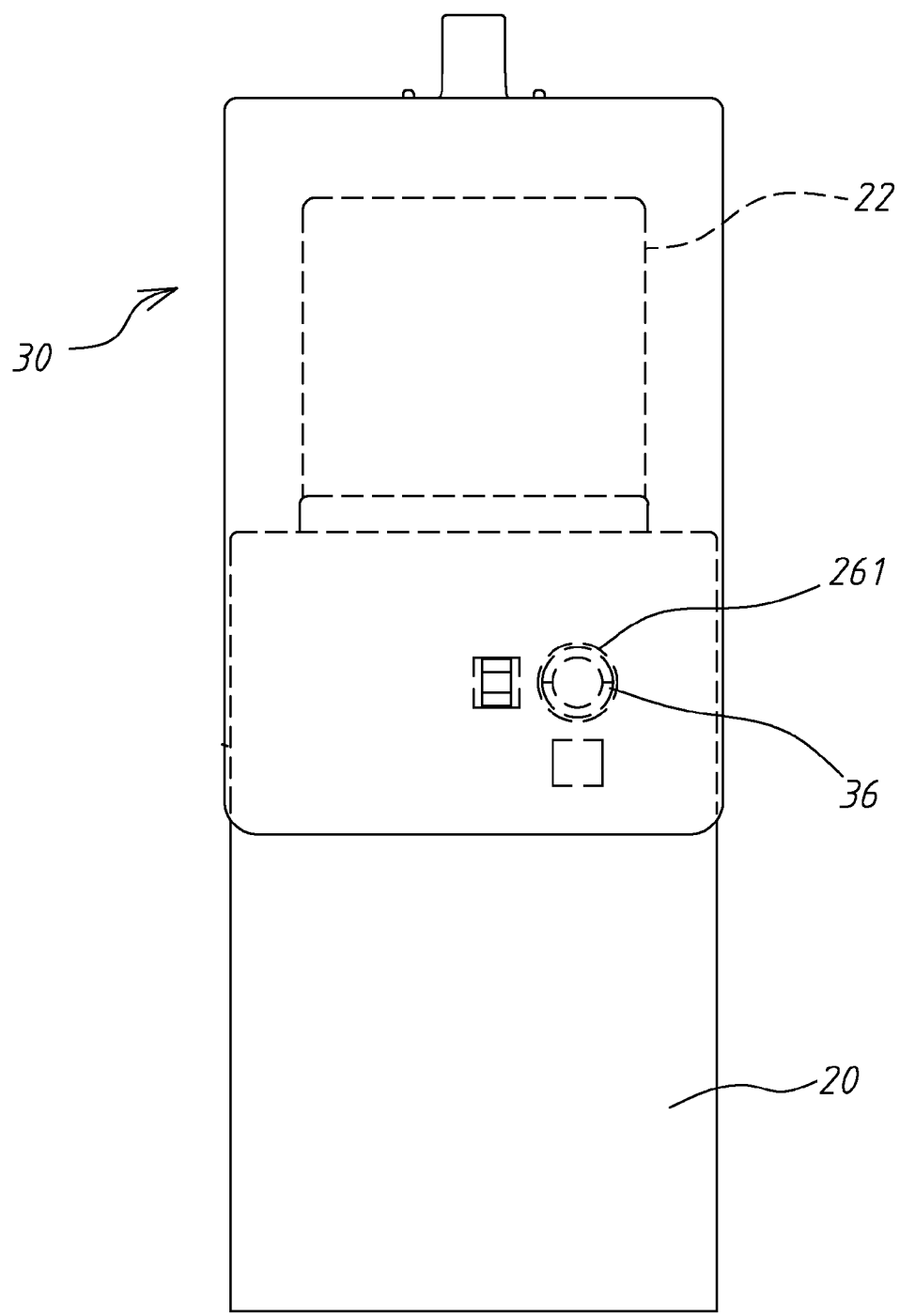
FIG. 12 is a schematic front view of the present invention, illustrating the protective cover in the closed position.
Figure 13:
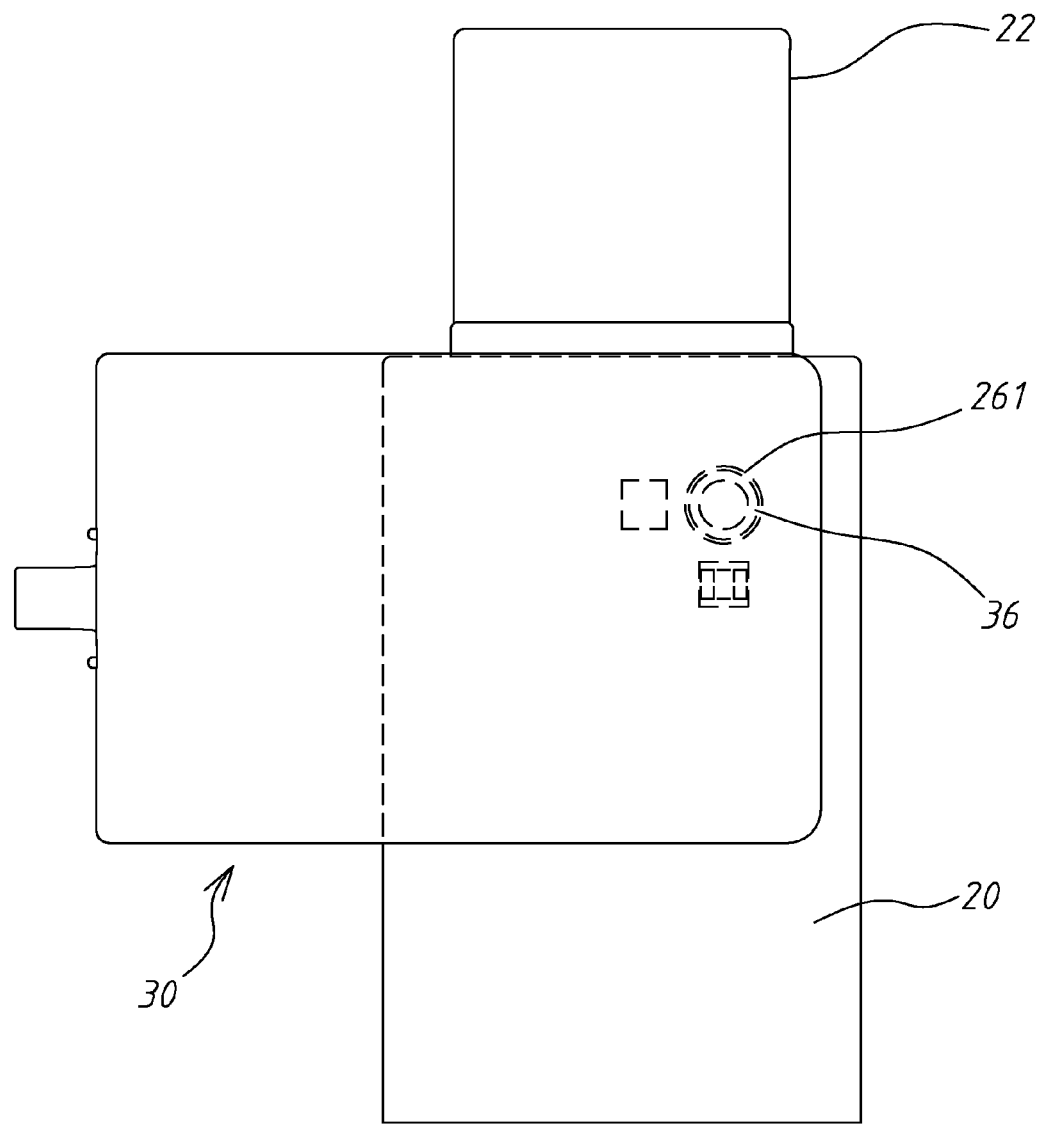
FIG. 13 corresponds to FIG. 12, illustrating the protective cover in the open position.

Referring to FIG. 12, when the flash drive and protective cover mounting structure is assembled, the protective cover 30 exhibits a smooth outer appearance without any machining traces, and can be biased relative to the casing 20 between an open position to expose the electrical connector 22, as shown in FIG. 13, and a closed position to shield the electrical connector 22, as shown in FIG. 12.

According to the present invention, the pivot connection structure of the protective cover 30 is located in the inner cover component 32 and kept from sight. After fabrication of the protective cover 30, the smooth outer surface of the outer cover component 31 is maintained intact without any further surface treatment. Because no any further surface polishing or other surface treatment is needed, the invention saves much fabrication time and cost, increasing product yield and value.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A flash drive and protective cover mounting structure, comprising a flash drive consisting of a casing, a memory module, a electrical connector and a positioning member, and a protective cover pivotally connected to said casing and biasable relative to said casing between an open position to expose said electrical connector and a closed position to shield said electrical connector, wherein:

said casing comprises an eccentric pivot positioning structure located at opposing top and bottom sides thereof;

said protective cover comprises a substantially U-shaped and relatively larger outer cover component and a substantially U-shaped and relatively smaller inner cover component mounted in said outer cover component, said outer cover component comprising a recessed inner surface area located at an inner side thereof, said inner cover component being positioned in said recessed inner surface area and comprising a pivot connection structure pivotally coupled to said eccentric pivot positioning structure of said casing.

2. The flash drive and protective cover mounting structure as claimed in claim 1, wherein said eccentric pivot positioning structure comprises an upper pivot-connection portion downwardly protruded from a bottom surface of a top wall of said inner cover component, a guide plate downwardly protruded from the bottom surface of the top wall of said inner cover component adjacent to said upper pivot-connection portion, a lower pivot-connection portion upwardly protruded from a top surface of an opposing bottom wall of said inner cover component and facing toward said upper pivot-connection portion, and a position-limit protrusion upwardly protruded from the top surface of the opposing bottom wall of said inner cover component adjacent to said lower pivot-connection portion.

3. The flash drive and protective cover mounting structure as claimed in claim 2, wherein said eccentric pivot positioning structure of said casing comprises an circular upper raised portion located in one corner of a top wall of said casing, an upper pivot hole cut through the center of said circular upper raised portion and pivotally coupled to said upper pivot-connection portion of said eccentric pivot positioning structure, a circular arched groove located in said circular upper raised portion around said upper pivot hole and movably coupled with said guide plate of said eccentric pivot positioning structure, a circular lower raised portion located in one corner of an opposing bottom wall of said casing corresponding to said circular upper raised portion, a lower pivot hole cut through the center of said circular lower raised portion and pivotally coupled to said lower pivot-connection portion of said eccentric pivot positioning structure, and a first recess and a second recess located in said circular lower raised portion around said lower pivot hole and spaced from each other at a predetermined angle and adapted for receiving said position-limit protrusion selectively.

4. The flash drive and protective cover mounting structure as claimed in claim 2, wherein said position-limit protrusion is double-beveled.

5. The flash drive and protective cover mounting structure as claimed in claim 1, wherein said outer cover component further comprises a retaining border edge smoothly curved and extending around said recessed inner surface area to secure said inner cover component firmly in said recessed inner surface area.

6. The flash drive and protective cover mounting structure as claimed in claim 5, wherein said eccentric pivot positioning structure comprises an upper pivot-connection portion downwardly protruded from a bottom surface of a top wall of said inner cover component, a guide plate downwardly protruded from the bottom surface of the top wall of said inner cover component adjacent to said upper pivot-connection portion, a lower pivot-connection portion upwardly protruded from a top surface of an opposing bottom wall of said inner cover component and facing toward said upper pivot-connection portion, and a position-limit protrusion upwardly protruded from the top surface of the opposing bottom wall of said inner cover component adjacent to said lower pivot-connection portion.

7. The flash drive and protective cover mounting structure as claimed in claim 6, wherein said eccentric pivot positioning structure of said casing comprises an circular upper raised portion located in one corner of a top wall of said casing, an upper pivot hole cut through the center of said circular upper raised portion and pivotally coupled to said upper pivot-connection portion of said eccentric pivot positioning structure, a circular arched groove located in said circular upper raised portion around said upper pivot hole and movably coupled with said guide plate of said eccentric pivot positioning structure, a circular lower raised portion located in one corner of an opposing bottom wall of said casing corresponding to said circular upper raised portion, a lower pivot hole cut through the center of said circular lower raised portion and pivotally coupled to said lower pivot-connection portion of said eccentric pivot positioning structure, and a first recess and a second recess located in said circular lower raised portion around said lower pivot hole and spaced from each other at a predetermined angle and adapted for receiving said position-limit protrusion selectively.

* * * * *